Dec. 5, 1933.                E. E. GREVE                1,938,523
                            BELT TIGHTENER
                         Filed Jan. 25, 1930
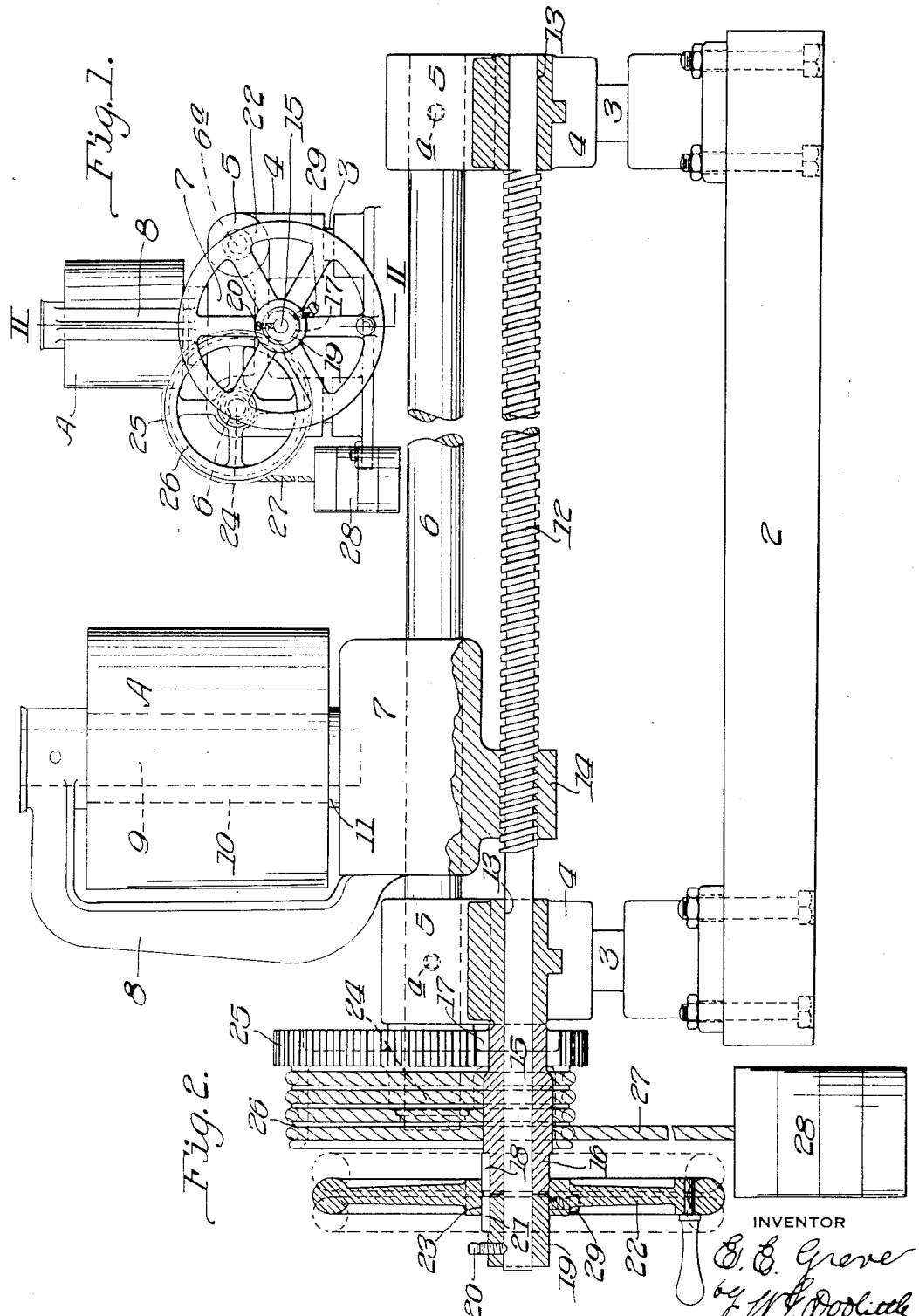
INVENTOR
E. E. Greve
by W. F. Doolittle
Attorney.

Patented Dec. 5, 1933

1,938,523

UNITED STATES PATENT OFFICE 1,938,523

BELT TIGHTENER

Edgar E. Greve, Bellevue, Pa., assignor, by mesne assignments, to Oil Well Supply Company, Pittsburgh, Pa., a corporation of New Jersey Application January 25, 1930. Serial No. 423,459

6 Claims. (Cl. 64—5)

This invention relates to improvements in belt tighteners of the character comprising a movable carriage having a belt-engaging pulley adapted for engagement with a traveling belt for the purpose of maintaining the desired tension in the belt.

Among the objects of my invention are, to provide selective manually and automatically operable actuating means designed to cooperate with means for shifting a belt-engaging pulley into the desired operative position relatively to a traveling belt; to provide new and improved automatically operable actuating means associated with the pulley shifting means for automatically maintaining the pulley against the belt to effect the desired tension on said belt; and to provide a new and improved belt tightener device including a shiftable pulley carriage having threaded means designed to engage a rotatable threaded shaft for moving the carriage, in combination with means for selectively rotating said shaft automatically or by hand.

Additional objects and advantages will become apparent from the following description taken in connection with the accompanying drawing, wherein:

Fig. 1 is an end elevational view of a belt tightener embodying my invention; and Fig. 2 is an enlarged vertical sectional view, partly in elevation, taken on the line II—II of Fig. 1.

In the drawing, 2 designates longitudinally extending base members adapted to be positioned in any suitable manner substantially perpendicular to the path of travel of a belt to be tensioned. Adjacent the ends of said members and secured thereto, I provide spaced-apart posts 3 carrying brackets or multiple bearing members 4. These members 4 are provided with spaced-apart bearings 5 for receiving parallel carriage supporting and guide shafts 6 and 6a, said shafts being fixedly secured therein by means of set screws a.

Slidably mounted on the shafts 6 and 6a, I provide a suitable pulley carriage, generally designated 7. This carriage includes a C-bracket 8 and a vertical jack shaft 9 therein for mounting an idler pulley A. The hub 10 of said pulley preferably rests on a bearing plate 11 of the carriage, to permit the pulley to rotate freely on the shaft 9. If desired, ball or roller bearings may be employed to mount said pulley on the shaft 9.

For the purpose of imparting a longitudinal movement to the pulley A and its carriage, I have provided cam means cooperating with the carriage 7. In the drawing I have shown, as a preferred example of such cam means a threaded adjusting shaft 12 having its end portions rotatably mounted in central openings 13 of the bearing members 4. Said shaft extends parallel to the guide shafts 6 and 6a, and is preferably disposed in a plane below that of said guide shafts. The pulley carriage 7 is formed with a depending internally threaded portion 14, designed for engagement and cooperation with the threaded shaft 12. It will be seen that rotation of the shaft 12 will impart a longitudinal movement to the carriage 7 and its pulley A, said carriage being guided and supported by means of the shafts 6 and 6a.

A characteristic and important feature of the present invention resides in the means for actuating the threaded shaft 12, whereby the shaft may be rotated selectively, either automatically or by hand.

To this end, the shaft 12 extends at one end thereof beyond the bearing member 4, as at 15, for receiving a freely rotatable sleeve or bushing 16. This sleeve 16 is provided with a pinion gear 17, preferably integral therewith, and with a projecting key 18 adjacent the outer end thereof. To the outer end of the shaft extension 15 is secured a collar 19 of the same diameter as the sleeve 16, and having a set screw 20 for binding engagement with the shaft, said collar also being provided with a projecting key 21.

A hand wheel 22 is slidably mounted on the sleeve 16 and collar 19, and is formed with a key-way 23 adapted to engage the keys 18 and/or 21. As shown in the full lines of Fig. 2, the hub of the hand wheel may span both of said keys, thereby connecting the sleeve 16 and the collar 19, whereby the sleeve and collar may be rotated in unison.

The guide shaft 6 also extends beyond a bearing member 4 to provide a bearing stub portion 24. Mounted on said portion 24, and freely rotatable thereon, is a gear wheel 25, of such diameter as to mesh with the pinion 17 on the sleeve 16. Extending axially of said gear and preferably integral therewith, is a rotatable member in the form of a cable drum 26. This drum is designed to receive a cable 27 wound thereon. To the free end of said cable is attached a suitable weight 28, adapted to function by gravity to produce a rotation of the drum 26 and gear wheel 25.

In the use of the belt tightener embodying my invention, the device is positioned adjacent the belt to be tightened (not shown) in such a manner that the longitudinal axis of said device is substantially perpendicular to the path of travel of the belt. While thus positioned, the hand wheel 22 having a set screw 29 is manually turned to cause the carriage carrying pulley A, through the action of threaded shaft 12 and threaded portion 14 of the carriage, to move into the initial desired operative position relatively to the belt. To effect this movement, the hand wheel 22 is moved outwardly from the full line position, Fig. 2, to the outward dotted line position, thus engaging the key 21 of the fixed collar 19 on the extended portion of the shaft 12. After thus positioning the pulley A relatively to the belt, hand wheel 22 is moved inwardly into operative engagement with the key 18 of sleeve 16 and out of engagement with key 21.

While in the last mentioned position, it is evident that, upon rotating the hand wheel, the weighted cable 27 may be wound on the drum 26 through the action of gear 25 and pinion gear 17, thus setting the automatically operable actuating means for automatic operation. Prior to the functioning of said means, the hand wheel must be moved into the full line position of Fig. 2, so that it may engage both of the keys 18 and 21, and cause the carriage and its pulley to be moved towards the belt to take up slack in the belt. This movement is accomplished by rotating shaft 12 through the action of the weight and the intermediate gearing, sleeves and collar.

The ratio between the gear 25 and the pinion 17 is of sufficient magnitude to provide an extremely sensitive device, so that a slight decrease in the tension of the belt will be taken up immediately by the action of the weight 28 and its associated parts.

Various changes and modifications are contemplated, provided they fall within the scope of the following claims.

I claim:

1. A belt tightener device including a base structure, an idler pulley carriage movably mounted on the base structure, an idler pulley on the carriage, and means for moving the carriage comprising a screw-threaded member and a weight tending to rotate said screw threaded member in the direction to tighten the belt.

2. A belt tightener device including a base structure, an idler pulley carriage movably mounted on the base structure, an idler pulley on the carriage, means for moving the carriage, and automatically operable actuating means for the carriage moving means comprising a weighted cable and a rotatably mounted member over which the cable extends, said carriage moving means including a threaded shaft and an internally threaded portion on the carriage.

3. A belt tightener device including base members and spaced-apart bearing members thereon, parallel longitudinal guide shafts extending between the bearing members, an idler pulley carriage slidably mounted on said shafts, an idler pulley on the carriage, means for moving the carriage on the shafts including a rotatable threaded shaft parallel to said guide shafts and an internally threaded portion on the carriage engageable therewith, and automatically operable actuating means for the carriage moving means comprising a weighted cable and a rotatably mounted member over which the cable extends.

4. A belt tightener device including spaced-apart parallel guide shafts, an idler pulley carriage slidably mounted on said shafts, an idler pulley on the carriage, a rotatable threaded shaft extending parallel to said guide shafts, an internally threaded portion on said carriage and engaging the threaded shaft, a sleeve freely rotatable on an extension of said shaft, a pinion gear rotatable with the sleeve, a key on said sleeve, a collar fixedly secured to the end portion of said shaft and having a key thereon, a hand wheel slidably mounted on the sleeve and collar for engaging said keys, and automatically operable means for rotating said pinion gear.

5. A belt tightener device including spaced-apart parallel guide shafts, an idler pulley carriage slidably mounted on said shafts, an idler pulley on the carriage, a rotatable threaded shaft extending parallel to said guide shafts, an internally threaded portion on said carriage and engaging the threaded shaft, a sleeve freely rotatable on an extension of said shaft, a pinion gear rotatable with the sleeve, a key on said sleeve, a collar fixedly secured to the end portion of said shaft and having a key thereon, a hand wheel slidably mounted on the sleeve and collar for engaging said keys, and automatically operable means for rotating said pinion gear to move the carriage, said means including a gear wheel for engaging the pinion gear, a cable drum rotatable with the gear wheel, a cable wound thereon, and a weight on the cable for rotating the drum and gear wheel by a movement of said weight.

6. In a belt tightener, a movable carriage, a belt engaging pulley on the carriage, and means for moving the carriage and pulley comprising a threaded shaft, manually operable means for rotating the shaft, and yieldable means connectible to and disconnectible from said shaft by said manually operable means, said yieldable means biasing said shaft in the direction to tighten the belt.

EDGAR E. GREVE.